Patented Nov. 5, 1929

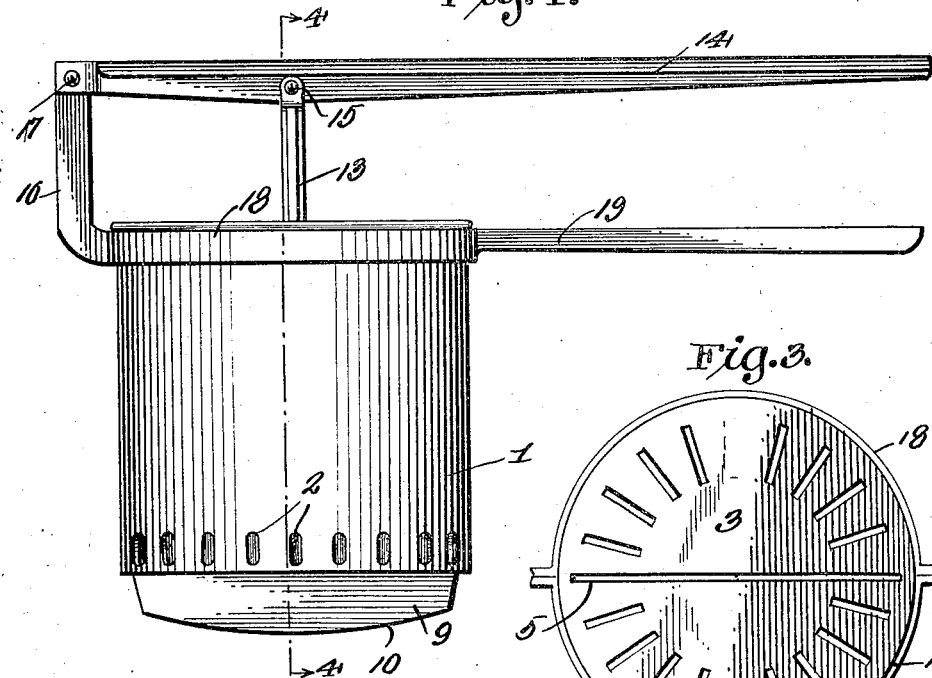

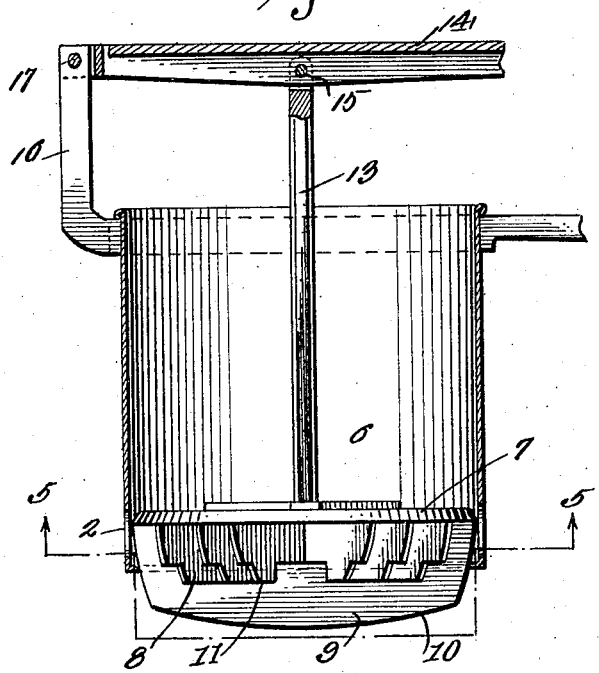
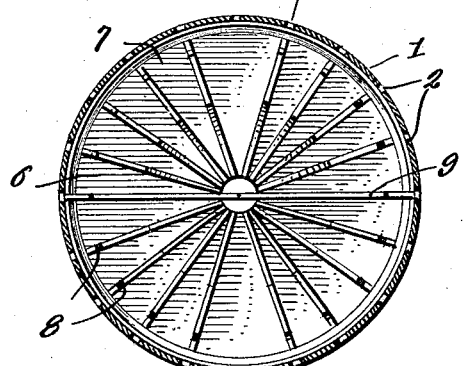
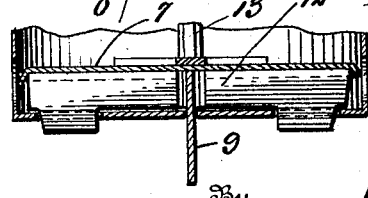

1,734,265

UNITED STATES PATENT OFFICE

EDWARD H. MITCHAM, OF NEW YORK, N. Y.

FRUIT SQUEEZER

Application filed August 29, 1927. Serial No. 216,289.

This invention relates to a fruit squeezer and has for its primary object the construction of a device of this character that will more effectively squeeze various types of fruit irrespective of the contour thereof.

An object of the invention is the designing of the plunger in a manner to not only cut the fruit into the desired portions, but capable of subjecting the cut fruit to the required compression all by a single progressive movement of the plunger.

Another object of the invention is the cooperative action of the plunger and the receptacle so as to assure a positive cutting of the fruit prior to the compressing thereof, thereby assuring the complete squeezing of the contents of the fruit.

Besides the above my invention is distinguished in the novel manner of designing and constructing the various parts of the device so that the same may be very easily assembled to materially reduce the cost of manufacture with the various parts so disposed as to function accurately at all times while at the same time allowing ready access thereto for cleaning purposes.

With these and other objects in view the invention will be better understood from the following detailed description taken in connection with the accompanying drawings, wherein:

Figure 1 is a side elevation of the squeezer,

Figure 2 is a top plan view partially in section,

Figure 3 is a plan view of the receptacle,

Figure 4 is a vertical sectional view,

Figure 5 is a horizontal sectional view on the line 5—5 of Figure 4,

Figure 6 is a sectional view on the line 6—6 of Figure 5, and

Figure 7 is a detailed sectional view of the lever.

Again referring to the drawings illustrating one of the many constructions of my invention the numeral 1 designates a receptacle of cylindrical formation having a plurality of discharge openings 2 in its side wall contiguous to the bottom 3 of the receptacle. Arranged in the bottom 3 is a plurality of auxiliary slots 4 arranged in radial formation with relation to each other and to a single main slot 5 extending approximately across the entire width of the bottom. A compressing and cutting device 6 is mounted within the receptacle which consists of a plunger 7, a plurality of auxiliary knives 8, and a single main knife 9, which knives are adapted to cooperate with the heretofore mentioned slots for cutting the fruit into the required portions to be properly squeezed. The relative position of the cutting edge 10 of the main knife and the cutting edges 11 of the auxiliary knives are such that the cutting edge 10 passes through the main slot prior to the passage of the edges 11 through the auxiliary slots, thereby subjecting the fruit initially to a single cut for halving the same with the auxiliary knives coming into action subsequently for cutting the halves into the required portions to accomplish the proper squeezing action to assure the complete squeezing of the cut portions. I wish to call particular attention to the configuration of the auxiliary knives which is such that the knives only partially pass through the auxiliary slots so that the body portion 12 may subject the cut fruit portions to a compressing action, thereby functioning with the plunger 7 to effectively squeeze the fruit to extract the entire juice contents thereof.

The plunger 7 has projecting therefrom the stem 13 pivotally connected to a lever 14 as indicated at 15. This lever 14 is pivotally connected to supporting arm 16 by the pivot pin 17. The supporting arm 16 is an extension of the ring sections 18 carried by the handle 19, the latter arranged in parallel space relation with the lever 14 so that a hand of the operator may grip both the handle and the lever for subjecting the plunger 7 to the proper pressure.

In the operation of the device an article of fruit is placed in the receptacle to rest upon the bottom thereof so that when the plunger is arranged within the receptacle and brought into contact with the fruit, pressure upon lever 14 will cause the various knives to pass through the fruit for cutting the same into the required portions. Immediately the fruit is cut into the required portions the combined pressing action of the body portions of the auxiliary knives and the under surface of the plunger 7 will positively extract all of the fruit juices from the cut portions which juices may pass freely through the slots and through the discharge openings 2. It is of course to be understood that the pivotal connection between the lever 14 and the support 16 and the stem 13 is such that the plunger may be thrown entirely out of the receptacle to facilitate the arrangement of the fruit in the receptacle and for removing the fruit residue after the compressing operation. In concluding, I wish to call particular attention to the novel manner of constructing and connecting together the various parts of the device so that the cost of manufacture is materially reduced while at the same time allowing ready access to the various parts for renewal or cleaning purposes. It is of course to be understood that various parts may be designed in various other manners than illustrated and connected together in other relations and, therefore, I do not desire to be limited in protection in any manner whatsoever except as set forth in the following claims.

What I claim is:

1. In a device of the class described, a cylindrical receptacle having a bottom formed with a diametric slot and, at opposite sides of the diametric slot, with slots radial to the axis of the bottom, a plunger comprising a cylindrical head having a flat under face, the plunger being slidably fitted in the receptacle, means operable to effect downward movement of the plunger in the direction of the bottom of the receptacle, a blade upon the under side of the plunger head extending diametrically thereof and adapted to enter the diametric slot in the bottom of the receptacle, and other blades upon the under side of the head of the plunger radial to the axis of the head and adapted to enter respective ones of the radial slots in the said bottom of the receptacle.

2. In a device of the class described, a receptacle having a bottom formed with a diametric slot and other slots radial to its axis and in series at opposite sides of the first mentioned slot, a plunger comprising a circular head slidably fitting in the receptacle and having a flat under side, a blade upon the under side of the plunger head extending diametrically thereof and positioned to enter the diametric slot in the bottom of the receptacle, and other blades upon the under side of the plunger head extending radial to the axis thereof and located in semi-annular series at opposite sides of the first mentioned blade and positioned to enter respective ones of the radial slots in the bottom of the receptacle, the diametric blade projecting below the plane occupied by the cutting edges of the radial blades.

In testimony whereof I affix my signature.

EDWARD H. MITCHAM.